Oct. 6, 1936.   A. H. WIEDHOFFT   2,056,756
OIL FILTERING DEVICE
Filed June 17, 1935   2 Sheets-Sheet 1

INVENTOR.
Alfred H. Wiedhofft
BY
HIS ATTORNEYS.

Oct. 6, 1936.   A. H. WIEDHOFFT   2,056,756
OIL FILTERING DEVICE
Filed June 17, 1935   2 Sheets-Sheet 2
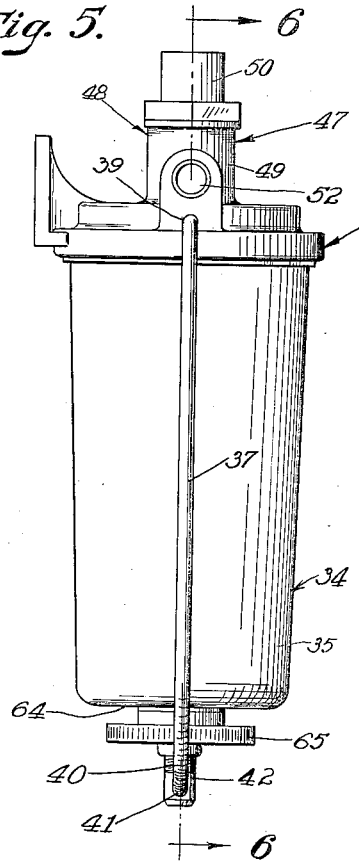
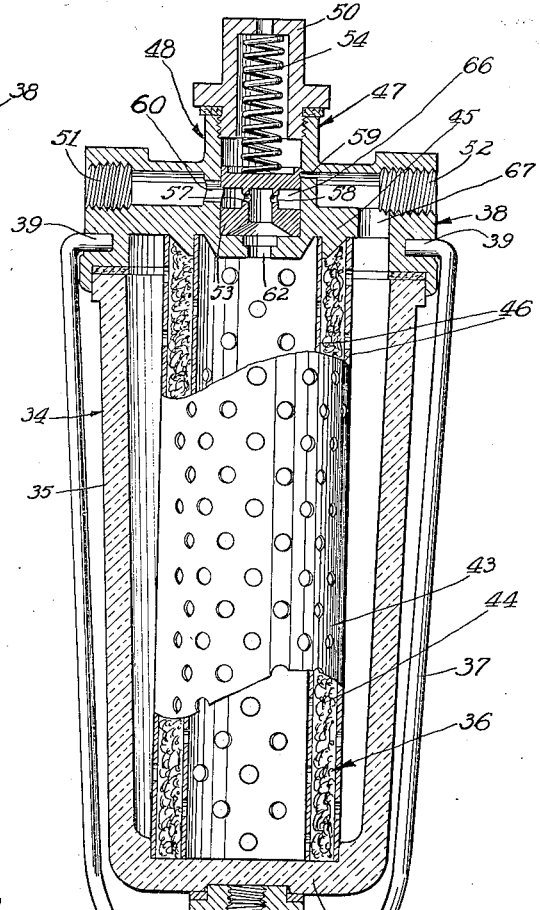
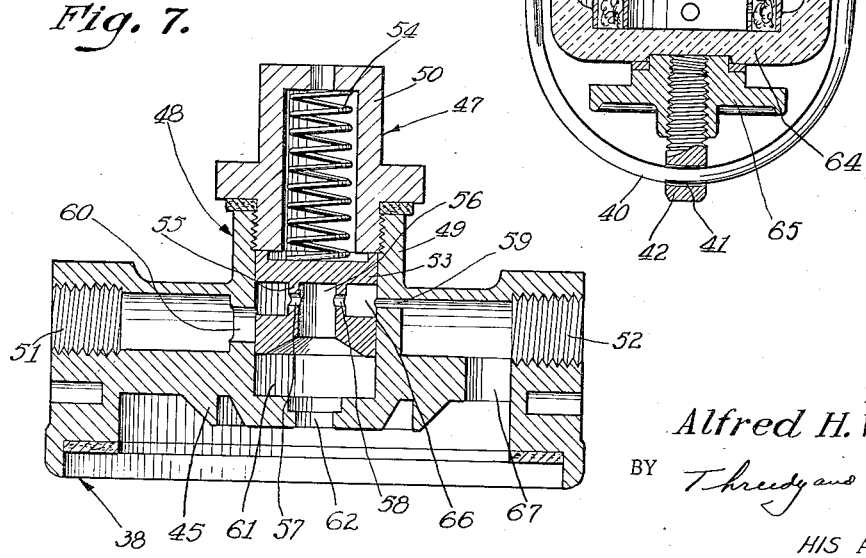
INVENTOR.
Alfred H. Wiedhofft
BY Threedy and Cannon
HIS ATTORNEY Patented Oct. 6, 1936

2,056,756

UNITED STATES PATENT OFFICE 2,056,756

OIL FILTERING DEVICE

Alfred H. Wiedhofft, Chicago, Ill., assignor of one-third to Irving R. Heinzel and one-third to A. W. Lewis, Chicago, Ill.

Application June 17, 1935, Serial No. 26,979

6 Claims. (Cl. 210—166)

This invention relates to an oil filtering device.

It is an object of this invention to provide an improved oil filtering device which is relatively simple and inexpensive in construction and efficient in use.

In the use of oil filtering devices in connection with internal combustion engines and the like it has been found that, frequently, the pressure of the oil in the oil filter will build up to a point where it will rupture the casing of the oil filter. This, it has been found, is especially apt to happen when the oil in the filter congeals and sediment accumulates therein, thereby increasing the resistance offered to the flow of oil through the filter.

Attempts have been made, heretofore, to eliminate this difficulty and one way in which this has been attempted has been to provide a by-pass valve which automatically cuts off the flow of the entire oil stream through the filter when the pressure therein rises above a predetermined point or pressure. This, however, has not solved the problem because such a by-pass valve causes sudden and abrupt changes of pressure in the oil system, since it abruptly cuts off the flow of the entire oil stream through the oil filter when the pressure therein rises above a predetermined point, whereas the desideratum in any oil filter is that it permit a substantially uniform pressure to be maintained in the oil filter and in the oil system associated therewith, at all times; and this can not, of course, be accomplished when the oil stream is entirely prevented from passing through the oil filter by the action of such a by-pass valve.

It is, therefore, an object of this invention to provide a valve unit, adapted for attachment to an oil filter, and by means of which the volume of oil passing through the filter is automatically regulated so that it is at all times proportioned to the pressure in the filter itself; a part of the oil stream passing through the oil filter being shunted or by-passed around the same, in the event that the pressure in the oil filter increases or builds up to a pressure greater than a predetermined point or pressure, thereby preventing the casing of the oil filter from being ruptured while at the same time permitting part of the oil stream to flow through the filter at all times, so that the pressure therein and in the oil system itself is maintained substantially uniform at all times and not subject to sudden and abrupt changes, as in the use of the prior art devices.

Another object of the present invention is to provide an improved oil filter for internal combustion engines and the like which is so constructed that it may readily be taken apart for the purpose of cleaning or repairing the same.

Other objects will appear hereinafter.

The invention consists in the novel combination and arrangement of parts to be hereinafter described and claimed.

The invention will be understood best by reference to the accompanying drawings, showing the preferred form of construction and in which:

Fig. 5 is a side elevational view of a modification of the invention;

Fig. 6 is a sectional view, on line 6—6 in Fig. 5; and

Fig. 7 is an enlarged sectional view similar to Fig. 6, showing the movable parts in a changed position.

Figure 1:
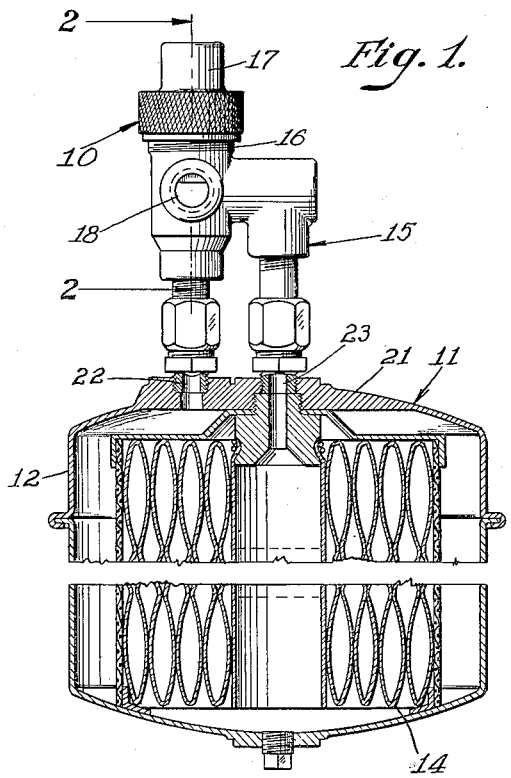
Fig. 1 is a view, partly in side elevation, and partly in section, showing a preferred form of the present invention attached to an oil filtering device of known design.

A preferred form of the present invention is shown in Figs. 1 to 4 inclusive of the drawings, is therein generally indicated at 10, and is shown as associated with an oil filtering device of known design, which is generally indicated at 11; this oil filtering device 11 including a casing 12 having an oil filtering element 14 therein.

As hereinbefore stated, it has been found, in the use of oil filtering devices, that oil congealing and sediment collecting in the filtering element 14 will increase the resistance offered to the flow of oil therethrough to such an extent that the casing 12 of the filter may become ruptured. Accordingly, in order to overcome this difficulty experienced in the use of oil filtering devices, according to the present invention, there is provided a valve unit 10 which is adapted for attachment to the casing 12 of the oil filtering device; the valve unit 10 being constructed, and being associated with the oil filter 12, in a manner presently to be described.

The new valve unit 10 comprises a casing, generally indicated at 15, and which has an externally threaded neck 16 to which is detachably attached a closure member 17; and provided in the valve casing 15 is an inlet 18 for the sediment-bearing or unfiltered oil and a passage 19 by which the same may flow from the valve casing 15 into the oil filtering device 12; likewise provided in the casing 15 is an outlet 13 for the relatively clean and filtered oil, and opening into this outlet 13 is a passage 20 through which oil may pass by a relatively restricted port 31, (Fig. 3), from the casing 12 of the oil filter into the outlet 13 of the valve casing 15 when the valve unit 10 is attached to the filter casing 12 in the manner presently to be described; the inlet 18 and the outlet 13 being connected into the circulatory system of a motor or the like in a manner which is well understood in the art.

To attach the valve unit 10 to the casing 12 of the oil filtering device 11, the passage 19 (which provides the inlet to the filter casing 12) is connected into an opening 22 which is provided in the top wall 21 of the filter casing 12 and the passage 20 (which provides the outlet from the filter casing 12) is connected into an opening 23 which is likewise provided in the top wall 21 of the casing 12.

Slidably mounted in the valve casing 15 is a valve member, which is generally indicated at 24, and which is of the so-called floating piston type. This valve member 24 includes a piston 25 and this piston 25 has a transverse wall 26 extending thereacross between its ends. Arranged partly within the closure member 17 and partly within the piston 25 of the valve member 24 is a coil spring 27, one end of which abuts the transverse wall 26 of the piston 25.

Arranged between the upper and lower end portions 69 and 32, respectively, of the valve member 24 is a relatively restricted throat or central portion 28; this throat 28 opening at its lower end into the lower end portion 32 of the valve 24 and merging at its upper end into the transverse wall 26 of the piston 25. This throat or central portion 28 provides an annular chamber 33 in the valve 24.

A plurality of ports, indicated at 29 and 30, afford communication between the annular chamber 33 and the interior, 68, of the throat, 28. At certain positions of the valve member 24 the annular chamber 33 serves as a by-pass to connect the inlet 18 directly with the outlet.

*Operation of the device shown in Figs. 1 to 4 inclusive*

Figure 2:
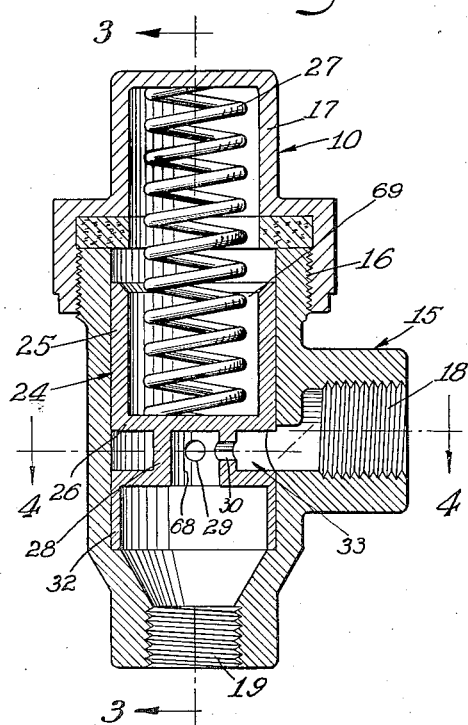
Fig. 2 is a sectional view, on line 2—2 in Fig. 1, showing a preferred form of the new valve unit which is adapted for attachment to oil filters of known design, such as, for example, that shown in Fig. 1.

The spring 27 normally urges the floating piston 25 of the valve unit 10 into the position in which the parts are shown in Fig. 2, and in which position the annular by-pass 33 is disposed out of communication with the outlet 13 for the filtered oil from the filter casing 12.

Accordingly, when the valve unit 10 is installed upon the casing 12 of the oil filtering device 11, the unfiltered oil from the crank case and pump will flow through the inlet 18 into the casing 15 by way of the annular chamber 33 of the valve member 24, ports 29 and 30, and passage 68 in the throat 28 of the valve member, and thence during the normal operation of the filtering element 14 the oil will flow out of the casing 12 through the passage 20 and port 31 to the outlet 13. From the inlet 13 it flows back to the crank case and pump in the usual manner. The piston 29 is normally held by the spring 27 in the position in which it is shown in Figure 2 and in which position the by-pass port 33 is disposed out of communication with the outlet passage 20.

Figure 3:
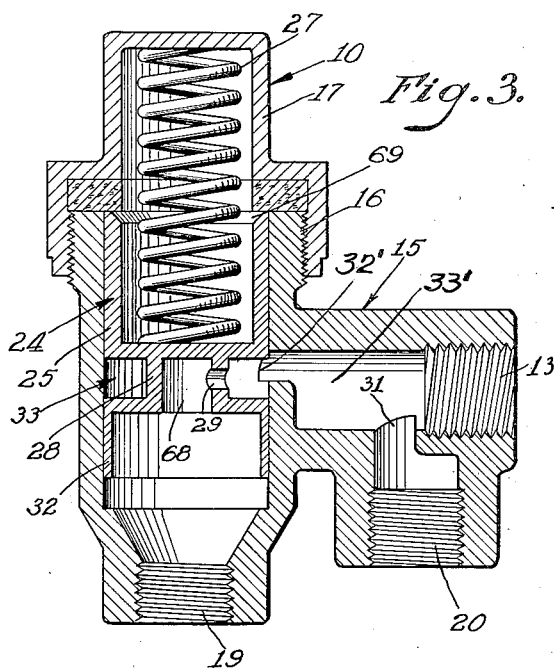
Fig. 3 is a sectional view, on line 3—3 in Fig. 2, showing the piston 25 in a raised position relative to the position in which the same is shown in Fig. 2.
Figure 4:
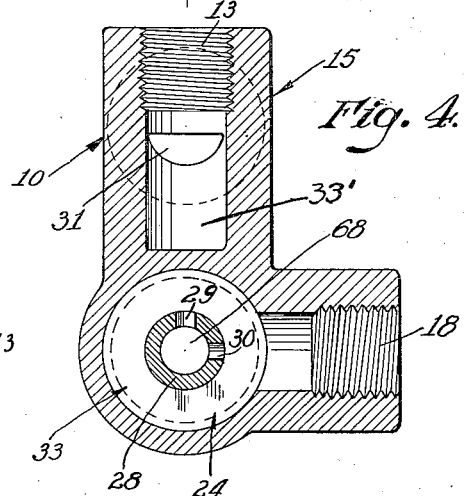
Fig. 4 is a sectional view, on line 4—4 in Fig. 2.

However, if, for any reason, the oil pressure in the filter casing 12 increases to a predetermined pressure or safety limit, the piston 25 will be raised or lifted, against the action of the spring 27 from the position in which the same is shown in Figure 3, thereby establishing communication between the by-pass port 33 and the outlet passage 13, whereupon a part of the oil stream which normally flows through the passage 19 into the filter casing 12 will be diverted from its normal path and will pass from the inlet 18, into the annular chamber 33, and thence by way of the port 32' and by-pass connection 33' into the outlet 13 from which the unfiltered oil is returned to the crank case.

In this manner a part of the oil stream is diverted away from, or by-passed around, the oil filter device 11 and its casing 12; and is by-passed directly through the valve unit 10, and thus the internal pressure of the oil in the filter casing 12 is relieved and the danger of the casing 12 rupturing due to excessive pressure therein is eliminated.

It is to be noted in this connection, however, that the upward movement of the piston-valve 25 which disposes the annular by-pass 33 in communication with the outlet 13 may not move this annular passage 33 entirely out of communication with the inlet 18 (Fig. 2), and a part of the oil stream may still flow through the ports 29 and 30 into the filter casing 12 while the by-pass 33, 32', 33' is functioning to relieve the excess pressure in the filter so that the flow of oil through the system with which the valve unit is associated is maintained relatively constant and uniform. Hence sudden and abrupt changes of pressure in the filter and in the system associated therewith are avoided.

However, when the cause of the excessive pressure in the filter casing 12 is removed, and the pressure of the oil in the casing 12 again returns to normal, the tensioned spring 27 will return the piston 25 to its normal position, as in Fig. 2, thus moving the annular by-pass 33 out of communication with the port 32' outlet passage 13, whereupon the entire oil stream will again flow through the inlet 18, by way of ports 29 and 30 into the interior 68 of the throat 28 of the valve member, and thence through the passage 19 into the casing 12 of the oil filter 11.

It will be noted that in the use of the present device the oil pressure applied against the piston 25 gradually moves the latter upwardly, against the action of the spring 27, (from the position in which the piston 25 is shown in Fig. 2 into the position in which the same is shown in Fig. 3), so that the by-pass 33 is gradually moved into communication with the outlet passage 13 to relieve excess pressure in the filter casing 12. In this manner the oil pressure in the filter 11, and in the oil circulatory system associated therewith, are automatically maintained substantially constant and uniform, and is not subjected to violent and sudden changes of pressure, as in certain of the prior art devices, while at the same time the danger of the filter casing 12 being ruptured by excess pressure is eliminated.

Construction of the modification shown in Figs. 5, 6, and 7

A modification of the invention is shown in Figs. 5, 6, and 7 and comprises an oil filtering device, generally indicated at 34. This oil filtering device 34 includes a glass or other transparent container or filter casing 35 having a filtering element 36 arranged therein. In the embodiment of the invention shown this filtering element 36 consists of a perforated cylindrical casing 43 having a body of porous filtering material 44 arranged therein.

The container 35 is detachably attached, by means of a bale 37, to a mounting 38 in which the angled arms 39 of the bale 37 are pivotally mounted; the bent portion 40 of the bale 37 being extended through an opening 41 which is provided in the head of a clamping screw 42 upon which is arranged a clamping nut 65 adapted to bear against the bottom wall 64 of the transparent container 35.

The upper end portion of the perforated cylinder 43 is held in effective or operative position in the casing 35 by means of an annular rib or wall 45 which is formed in the mounting 38 and which projects into the casing 43 between the walls 46 thereof, (Fig. 6).

A valve unit 47, which is similar to the valve unit 10, is arranged upon, and associated with, the mounting 38. This valve unit 47 comprises a valve casing, generally indicated at 48, which casing includes a body 49 having an open upper end upon which is arranged a closure member 50.

Provided in the head or valve casing 49 is an inlet 51 for the unfiltered oil and an outlet 52 for the filtered oil and slidably mounted in the valve casing 47 is a piston 53 of the so-called "floating" type, this piston 53 being normally urged, by a spring 54, into the position in which it is shown in Fig. 6. Provided in the piston 53 is a relatively narrow or restricted throat 55, and formed in this throat portion or neck of the piston 53 are a plurality of laterally opening ports indicated at 57 and 58.

Leading from the inlet passage 51 into the valve chamber or cylinder 61, in which the piston 53 is slidably arranged, is a port 60 and, leading from the outlet passage 52 into the valve chamber or cylinder 61 is a port 59; while leading from the valve chamber or cylinder 61 into the interior of the perforated cylindrical filter casing 43, when the latter is in assembled position, (as in Fig. 6), is a port 62.

Formed in the head 38 is a passage 67 which normally provides communication between the interior of the container or filter casing 35 and the outlet passage 52.

Operation of the modification shown in Figs. 5, 6, and 7

The perforated filtering element or cylinder 43 may be readily assembled upon the head or mounting 38 of the filter 34 by projecting the annular wall or rib 45 of the head 38 into the position in which it is shown in Fig. 6, and in which position, it projects into the perforated filter casing 43 between the walls 46 thereof; then abutting the clamping nut 65 of the clamping device 40—37 against the bottom wall 64 of the transparent container 35 and finally clamping the unit, thus assembled, together by turning the clamping nut or follower 65 upon its supporting screw 41.

When thus assembled, the oil filter 34 may be attached in position of use upon a motor or an engine, whereupon, under normal operating conditions, that is, when the oil pressure is normal, the unfiltered oil will flow into the inlet 51, through the opening 60, into the annular passage 66 formed by the relatively restricted or narrow throat 55 of the valve piston 53, through the ports 57 and 58, into the interior 56 of the piston 53 and thence, by way of the outlet 62, into the interior of the perforated filtering element or cylinder 43, wherein it is filtered by the filter element 44 which is arranged between the spaced walls 46 of the cylinder 43.

After passing through the perforated filtering element or cylinder 43, the filtered oil passes, by way of the port 67 (Fig. 6) into the outlet passage 52, for return to the crank case and pump.

However, if the oil pressure in the filter 36 builds up or increases to a predetermined danger point, the back pressure of the oil in the perforated cylindrical casing or filter element 43 will lift the piston 53 gradually against the action of the spring 54, (from its normal position, as in Fig. 6, into its position, as in Fig. 7) thereby gradually restricting the effective area of the port 60 communicating with the annular passage 66 and thus reducing the volume of oil passing into the filter by way of port 62 so as to proportion such quantity of oil to the reduced capacity of the filter 36 resulting from its clogged condition and indicated by the back pressure which operates the valve 53 in opposition to the pressure of its spring 54. With sufficient upward movement of the valve member 53 the annular passage 66 communicates with the port 59 leading to outlet 52, and thus the passage 66 becomes a by-pass permitting a portion of the oil to flow directly from the inlet 51 to outlet 52 without passing through the filter.

In this manner the excess pressure in the filter casing 35 is gradually relieved and at the same time only a part of the oil stream is diverted from its normal route and allowed to flow through the by-pass route so that a substantially uniform and constant pressure is maintained in the oil filter and associated oil system at all times.

It will be noted, in this connection, that the movement of the piston-valve 53 which moves the by-pass 66 into communication with the outlet 59—52 does not move said passage 66 out of communication with the inlet 60 (Fig. 7) hence a part of the oil will still flow through the inlet 60 and inlet port 62 into the filter casing 35 and thus the flow of oil through the filter is maintained relatively constant and uniform and is never at any time entirely cut off by the operation of the piston valve 53. Hence even if the filter element should become completely clogged a minimum flow of oil would be maintained through by-pass 66 until the condition could be remedied by cleaning the filter or replacing the element 36 with a new one.

When the cause of the increased pressure in the filter 34 is relieved the spring 54 will gradually return the piston 53 back into its normal or initial position (as in Fig. 2), thereby moving the by-pass port 66 out of communication with the outlet 52 and thus directing the flow of the entire oil stream back to its normal course through the route 51—60—66—57— and 62 into the filter casing 35.

It will be noted that the condition of the oil in the transparent filter casing 35 may be readily observed at all times and that the oil filter 34 may be readily taken apart for the purpose of cleaning or replacing the filtering element 43 by loosening the clamping nut 65 and pivoting the latter, by means of the bale 37, out of engagement with the bottom wall 64 of the casing 35, whereupon the perforated filtering cylinder 43 may be removed from the head 38 for replacement or repair.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scape of the appended claims.

Having thus described my invention what I claim as new and desire to protect by Letters Patent is:

1. A regulating device for a filter comprising a valve unit including a housing having an inlet for unfiltered oil and an outlet for filtered oil, said inlet affording connection with the inlet of the filter casing and said outlet affording connection with the filter casing outlet, a piston valve controlling said inlet of the valve housing and a spring urging said valve to fully open position, the valve being movable in response to back pressure in the filter casing and in opposition to its spring in the direction for restricting the inlet.

2. In a valve unit as defined in claim 1, said valve including a by-pass adapted to provide a direct connection between the inlet and outlet of the valve unit, said by-pass being positioned to be closed when the said inlet of the valve unit is fully open and to open as the valve moves in inlet-restricting direction.

3. A valve unit adapted for attachment to an oil-filtering device which includes a filter casing having an inlet for unfiltered oil and an outlet for filtered oil with a filtering element interposed between them in said casing, said valve unit including a cylinder adapted for connection at one end to the casing inlet and having an inlet passage for unfiltered oil opening into one side of said cylinder and an outlet passage opening from another side of said cylinder, said outlet passage including a connection for attachment to the outlet of the filter casing, and a piston valve in said cylinder having an annular recess in its surface between its ends, said recess being dimensioned to afford a direct connection between the inlet and outlet passages, said valve having a port leading from said recess through the end of the valve which is disposed toward the filter casing inlet, and said recess being dimensioned to close the outlet passage when the valve is positioned for fully opening the inlet, together with means yieldingly urging the valve to such position.

4. In a valve unit as defined in claim 1, said valve including a by-pass positioned to register with the outlet of the valve unit after the inlet is partially restricted by the initial portion of the valve movement in response to back pressure.

5. In a valve unit as defined in claim 1, said valve including a by-pass disposed to register with the outlet of the unit as the valve moves in response to back pressure and being dimensioned to increase the effective opening at said outlet as the inlet opening is restricted by the shifting of the valve.

6. In a valve unit as defined in claim 3, said annular passage being dimensioned and disposed to gradually restrict the inlet passage to the cylinder in response to back pressure acting against the piston from the filter and thereafter to register with the outlet passage and increase the effective opening thereof as the inlet is further restricted by said movement of the valve.

ALFRED H. WIEDHOFFT.